United States Patent Office 3,022,496
Patented Feb. 20, 1962

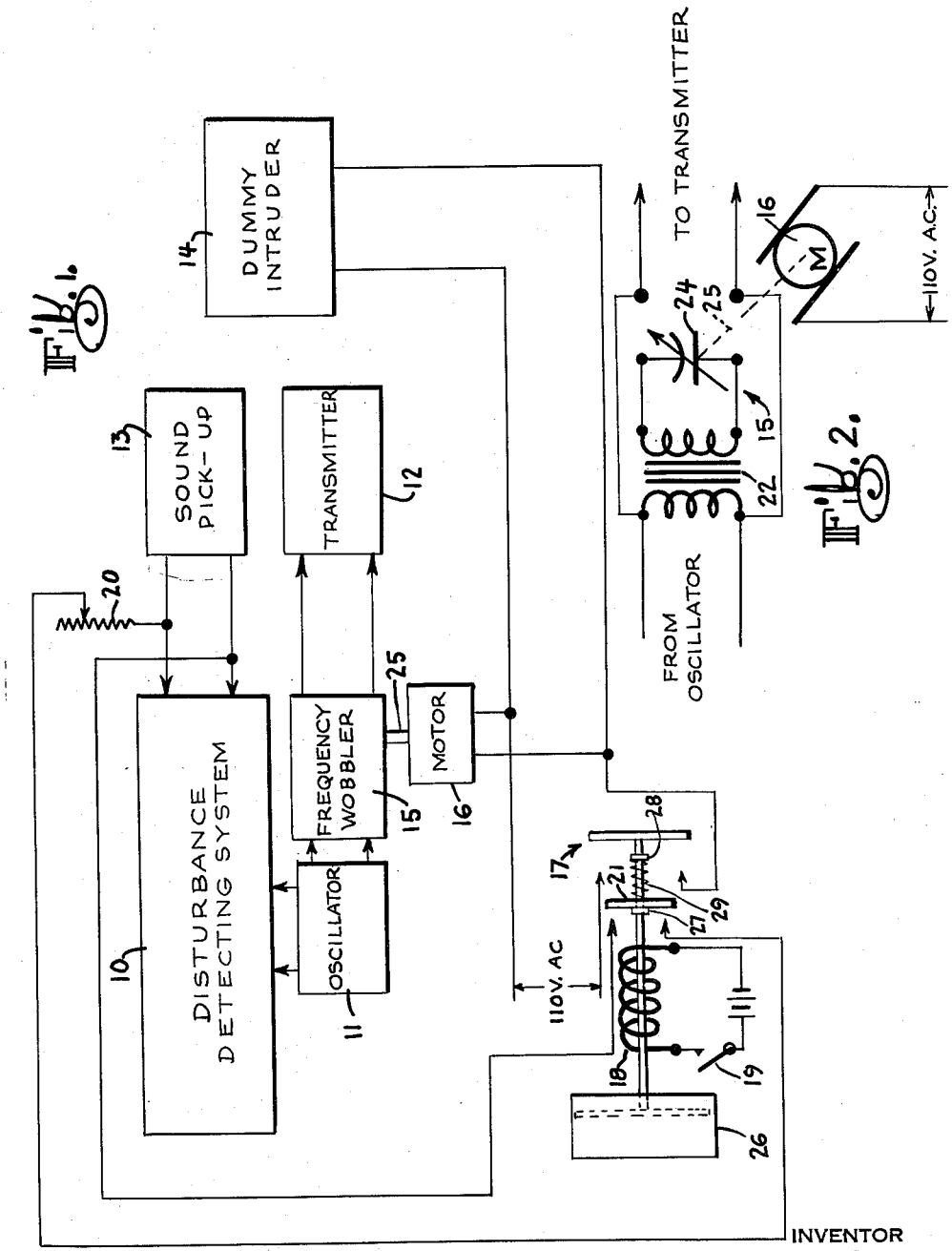

3,022,496
TESTING OF APPARATUS FOR DETECTING DISTURBANCES IN AN ENCLOSURE
Samuel M. Bagno, Belleville, N.J., assignor to Walter Kidde & Company, Inc., Belleville, N.J., a corporation of New York
Filed May 6, 1957, Ser. No. 657,294
7 Claims. (Cl. 340—214)

The present invention relates to apparatus for detecting disturbances in an enclosure by giving an alarm in response to the detection of frequency changes between transmitted and received radiations caused by disturbances in the enclosure, such apparatus being disclosed in my prior United States Patent No. 2,655,645, and, more particularly to an arrangement for testing the responsiveness of such apparatus.

Generally described, one form of such prior apparatus comprises an oscillator having a substantially constant frequency output, a sound transmitter connected to the output of the oscillator and adapted to radiate a standing wave energy pattern within the enclosure, a sound pick-up for receiving sound energy radiations and transducing the same to electrical radiations, an amplifier having its input connected to the output of the sound pick-up, a detector having an input operatively connected to the amplifier and having an input operatively connected to the oscillator, whereby an output signal is produced upon detection of a frequency difference between the transmitted and received radiations, and an alarm relay network including an alarm connected to the output of the detector through amplifying and rectifying means and rendered operative by the signal.

In such apparatus, the motion of an intruder or other disturbance within the enclosure sought to be detected produces a Doppler frequency in the wave pattern, whereby the received frequency becomes either greater or less than the transmitted frequency. This change in frequency is detected and causes the detector to generate the signal.

Heretofore, it has been customary to periodically test the apparatus for responsiveness simulating a disturbance within the enclosure to cause the signal to be generated. This usually was accomplished by positioning a movable element in the path of the radiations which, when moved, caused a Doppler frequency effect capable of being detected by the apparatus.

This method of testing would be satisfactory if the moving object being tested were the same order of size as an intruder and placed in the location in which it is desired to detect the intruder. Such a simulated test, although desirable, is not often possible because it is too inconvenient or unsightly.

In the past, it was attempted to get around this condition by using a small vane located in the transmitting transducer housing. Such a small vane introduces the following disadvantages:

(1) Due to the fact that the vane occupies a small volume, the reflection from the region has almost the same phase throughout the motion of the vane as the vane cuts the nodes and antinodes of the standing wave pattern in its vicinity. The result is that the reflection leaving the moving vane behaves more like an amplitude modulated wave with upper and lower sidebands than a Doppler wave of a single frequency. This is because the reflections from opposing walls falling on the moving vane cause a higher and lower Doppler frequency which behaves like two sidebands of an amplitude modulated signal. This amplitude modulated wave may arrive at the receiver at any phase in relation to the carrier. There it adds vectorally to the received carrier. Since the received carrier consists of what is reflected from everything else in the room as well as the high frequency bias fed to the detector, it is generally much greater in amplitude than the reflections from the moving vane. Thus if the amplitude modulated reflection is received 90° out of phase with the carrier, it is hardly detected, but if it arrives in phase with the carrier, its modulations are completely detected to give a maximum signal. In that way, the amplitude of the finally detected signal from the vane may vary by an order of magnitude and depend only on the phase of its arrival at the receiver. Since the phase of arrival varies with the velocity of sound at the moment, it likewise varies with the temperature, the parameter determining that velocity. For that reason a test using a small moving vane is not consistent with the sensitivity in the area if the frequency is constant.

(2) A moving vane of fixed dimensions by itself, even if it caused a consistent response, would in no way indicate if the sensitivity in an area were sufficient to catch an intruder. Some means of attenuation must be used to supplement it and make it respond only if the sensitivity were above the level required to detect the intruder.

Accordingly, an object of the present invention is to provide a testing arrangement which overcomes the foregoing difficulties and disadvantages.

Another object is to provide a test that can be adjusted for the area and indicate its condition at all times.

Another object is to provide a unit that can serve as an adjunct to an existing ultrasonic alarm and when connected to it will give a good test.

Another object is to get a consistent test with a vane that is sufficiently small to be hidden in the transducer housing.

A further object is to accomplish the foregoing in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by an arrangement comprising in combination an oscillator for producing radiations having a substantially constant frequency, a sound transmitter adapted to radiate a standing wave energy pattern within an enclosure, a sound pick-up for receiving sound energy radiations, means for wobbling the frequency of the radiations connected between the output of the oscillator and the input of the transmitter, means for simulating a disturbance within the enclosure, and means for rendering the last mentioned means and the oscillator operative. In its preferred form, the foregoing arrangement includes means for attenuating the output of the pick-up during testing of the apparatus.

A preferred embodiment of the invention has been chosen for purposes of illustration and description, and is shown in the accompanying drawing, forming a part of the specification, wherein:

FIG. 1 is a block diagram of an arrangement in accordance with the invention for testing the disturbance detecting apparatus.

FIG. 2 is a schematic view of an oscillator having a frequency modulated output.

Referring to FIG. 1 of the drawing in detail, a disturbance detecting system 10 is shown which is of the type disclosed in the aforementioned patent. This system includes an oscillator 11 for producing radiations having a substantially constant frequency, a sound transmitter 12 adapted to radiate a standing wave energy pattern within an enclosure and a sound pick-up 13 for receiving sound energy radiations having its output connected to the system 10.

A dummy intruder 14, which may be of the type shown in my prior United States Letters Patent, Reissue 23,820, is positioned in the path of the radiations and is adapted to cause a Doppler frequency effect upon operation thereof which effect is capable of being detected by the apparatus to actuate the same for test purposes.

A frequency modulator 15, driven by a motor 16, as about to be described in detail, is connected to the output of the oscillator 11.

The dummy intruder 14 and the motor 16 are connected in parallel in a power line and are adapted to be energized upon closing of a normally open switch 17 under the control of a relay 18 which is energized upon closing a test switch 19.

The output of the sound pick-up preferably is attenuated during the test in order to make the test consistent with the sensitivity required in the area. The necessity for such attenuation can be explained in the following manner. Since the energy radiated by the radiating transducer is distributed over the entire volume and an intruder only occupies a small portion of that volume, the amount of disturbance caused by the intruder depends on that volume ratio. The smaller the intruder in comparison to the enclosure, the smaller the percentage disturbance he will cause. Thus the larger the room, the more sensitivity is required by the receiver in order to give the same response. If the receiver sensitivity is close to maximum, that would correspond to the condition in which the enclosure is very much larger than the intruder. On the other hand, an intruder in a small room will produce a large change and very little sensitivity is required to detect it. The ultrasonic attenuator is used to adjust the ultrasonic system for the sensitivity required in the area. The moving test vane however, gives a constant percentage disturbance. Therefore, to make the test indicative of the sensitivity in the area to an intruder, the sensitivity must be further attenuated during the test, and that further attenuation must depend on the size of the area being protected. There are other factors that may also tend to determine the relative attenuations required for the test and for catching an intruder. Such factors as the reflectivity of the walls may also effect this ratio. However, changes in absorption and variable stock and amplifier sensitivity would tend to effect both the intruder and test vane sensitivities alike. Thus, once the test vane attenuator is adjusted to correspond to a desired intruder sensitivity, any change tending to make the system inoperative would be detected by a sensitivity test with the test vane, for example, by providing a resistor 20 adapted for connection across the output. The resistor, as shown, may be variable to adjust the degree of attenuation. A normally open switch 21, also under the control of the relay 18, upon closing, connects the resistor 20 across the sound pick-up output, whereby the dummy intruder, the frequency modulator and the attenuator are rendered operative simultaneously upon closing of the test switch 19.

Preferably, the action of the relay 18 is slowed down by a dashpot 26 and the opening of the switch 21 is delayed until the dummy intruder switch 17 has been open for a sufficient duration of time to immobilize the dummy intruder 14. Such time delay may be effected by slidably mounting the switch arm 21 on the relay armature between a pair of stops 27 and 28, positioning a spring 29 between the arm and the stop 28, and having the contacts for the arm 17 further away therefrom than the contacts for the arm 21.

As shown in FIG. 2, the frequency modulator 15 has its input coupled to the output of the oscillator 11 by a transformer 22 and has a variable capacitor 24 connected across its output. This capacitor is of the fixed and rotatable plate type and includes a shaft 25 driven by the motor 16 for effecting rotation of the rotatable plates. When these plates of the capacitor are rotated, the frequency is slowly changed by a small fraction of a percent. This change in frequency guarantees that at some point in the test the sideband signals generated by the vane will be in phase with the wobbled carrier frequency appearing across the detector to produce a maximum response.

That maximum response is constant for any given condition and thereby gives a uniform test. Such a uniform test combined with the test attenuation to make it correspond to the desired intruder response gives a consistent check of the operability of the system.

From the foregoing description, it will be seen that the present invention provides a simple, practical and economical arrangement for more effectively testing the responsiveness of disturbance detecting systems of the type described herein.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In apparatus for detecting the presence of disturbances within an enclosure comprising an oscillator for producing an output of substantially constant carrier frequency oscillations, a sound transmitter having an input connected to said oscillator and adapted to radiate energy at the frequency of the oscillations at said input to produce a standing wave energy pattern within an enclosure, a sound pick-up for receiving reflections of said transmitted sound energy radiations, and means connected to said oscillator and said pick-up for detecting the difference in frequency between the oscillator output and the received radiations; the combination of means connected to the input of said sound transmitter for slowly producing a small percentage variation in the carrier frequency at said transmitter input, means located within the standing wave energy pattern and received by said sound pick-up for simulating a disturbance within the enclosure to create side bands of a given frequency, and switch means connected for rendering said last mentioned means and said carrier frequency changing means operative, whereby, when the changing carrier frequency is in a phase with the side band frequency, a maximum response will be detected by the apparatus.

2. Apparatus according to claim 1, including attenuating means connected across the output of said sound pick-up.

3. Apparatus according to claim 2, wherein said attenuating means is a resistor.

4. Apparatus according to claim 3, wherein said resistor is variable.

5. Apparatus according to claim 2, wherein said switch means are connected for rendering operative said attenuating means together with said disturbance simulating means and said carrier frequency changing means.

6. Apparatus according to claim 5, wherein said switch means include means arranged to render said disturbance simulating means ineffective before rendering said attenuating means ineffective.

7. Apparatus according to claim 1, wherein said carrier frequency changing means include a motor driven variable capacitor.

References Cited in the file of this patent

UNITED STATES PATENTS

| | | |
|---|---|---|
| Re. 23,820 | Bagno | May 4, 1954 |
| 2,011,392 | Bentley | Aug. 13, 1935 |
| 2,510,299 | Schramm | June 6, 1950 |
| 2,683,855 | Blitz | July 13, 1954 |
| 2,708,746 | Shaw | May 17, 1955 |
| 2,732,544 | Bagno | Jan. 24, 1956 |
| 2,762,913 | Jepson | Sept. 11, 1956 |
| 2,826,753 | Chapin | Mar. 11, 1958 |